Jan. 11, 1955     A. H. SHACKELFORD     2,699,308
TREE HOLDER
Filed Dec. 8, 1949
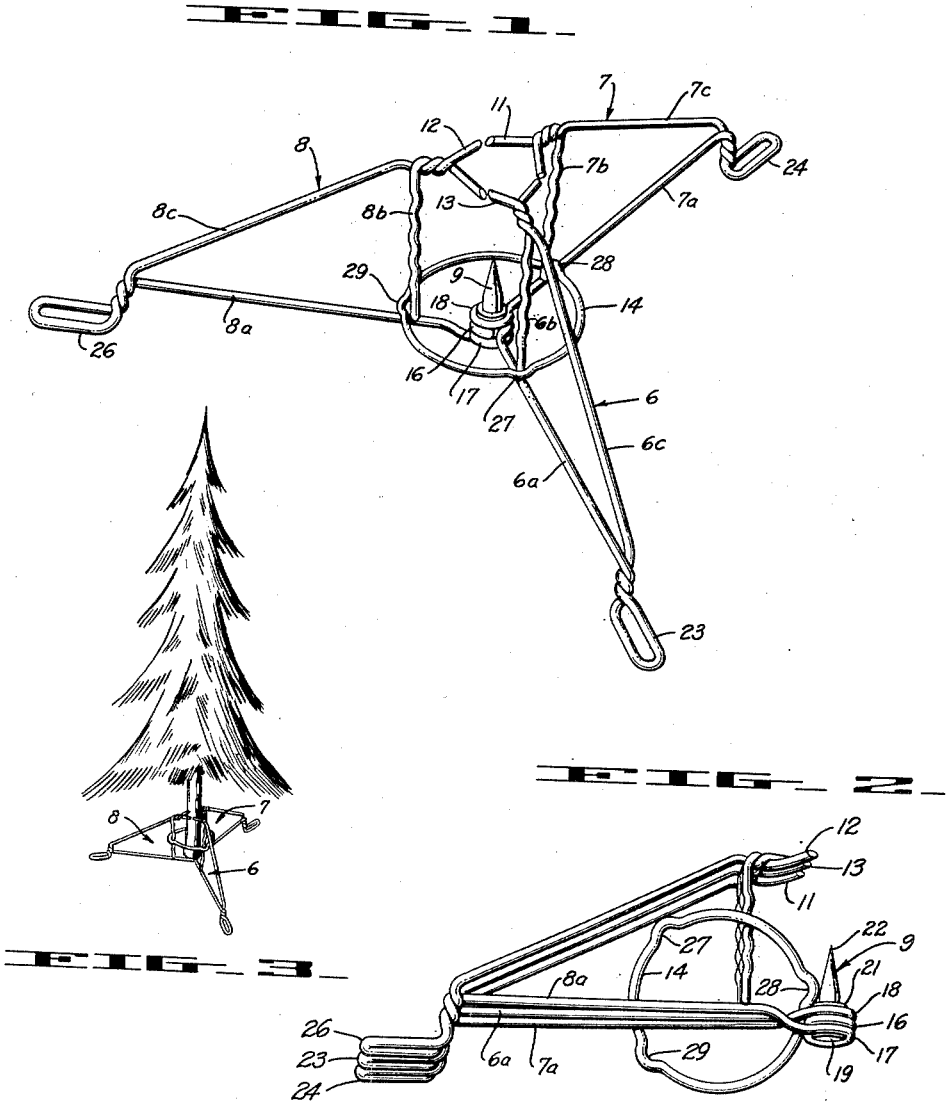
INVENTOR.
ARTHUR H. SHACKELFORD United States Patent Office 2,699,308
Patented Jan. 11, 1955

2,699,308

TREE HOLDER

Arthur H. Shackelford, Riverside, Calif., assignor to Robert L. Bidwell, San Francisco, Calif.

Application December 8, 1949, Serial No. 131,852

2 Claims. (Cl. 248—47)

The invention relates to stands or holders for supporting a Christmas tree or other columnar objects and in particular to such stands which are of a collapsible construction adapted for retaining in storage after use.

An object of the present invention is to provide a stand of the character described which may be quickly and easily made ready for use and applied to a tree trunk or the like and which, with minimum adjustment and effort, will hold a tree or other columnar object in perfectly upright position and provide a steady and attractive base support therefor.

Another object of the invention is to provide a stand of the character above which may with ease be removed from a tree or the like and quickly folded into a neat and compact form for storage when not in use.

A further object of the invention is to provide a stand of the character above which requires the use of a minimum amount of material and is of a design adapted to inexpensive mass production.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is a perspective view of a tree stand constructed in accordance with the present invention and shown in operative position to receive the trunk of a tree or the like.

Figure 2 is a perspective view of the stand in a folded position.

Figure 3 is a perspective view of the stand shown operatively applied to a tree.

The stand as illustrated in the accompanying drawing consists of a plurality of frames 6, 7 and 8 which are assembled about and hingedly connected to a tree base locating means 9 and include a plurality of tree-trunk engaging and gripping means 11, 12 and 13 carried by the frames in superimposed relation to the locating means 9 and spaced symmetrically about a vertical axis through such means, and a clamping means 14 for urging the gripping means 11—13 into engagement with the trunk of a tree or other columnar object to be supported.

In the present construction, the frames 6, 7 and 8 are of substantially right-triangular form, preferably composed of relatively stiff wire sides including substantially horizontal base sides 6a, 7a and 8a, substantially upright sides 6b, 7b and 8b, and diagonal or hypotenuse sides 6c, 7c and 8c. The hinge connection between the several frames may be simply effected, as here shown, by an extension of the base sides 6a, 7a and 8a of the frames beyond the vertical sides 6b, 7b and 8b and forming the terminal portions 16, 17 and 18 of such sides in circular loops which may be, as here shown, fitted upon a vertical pin forming the base locating means 9. This pin, as best shown in Figure 2, is provided with a headed end 19 underlying loop 17 and is fitted with a collar 21 overlying loop 18 and confining the three loops between the collar and the head. The upper portion 22 of the pin is desirably sharpened to provide an impaling means adapted for insertion into the base of the tree trunk or other columnar object to thereby hold such portion of the tree against lateral displacement. The base sides 6a, 7a and 8a of the frame desirably radiate from the pin in a substantially common horizontal plane, and to effect this the loop portions 17 and 18 are offset respectively downwardly and upwardly from the length of the corresponding base sides, as best shown in Figure 2, so as to lie on opposite sides of the loop 16 with the base sides 6a, 7a and 8a in a substantially common plane.

Feet 23, 24 and 26 are provided at the outer connected ends of the base and diagonal sides of the frames, and as a feature of the present construction these feet depend somewhat from the plane of the base sides to provide a relative elevation of such plane and in particular an elevation of the impaling means 9 and inner base ends of the frames. When a tree or other columnar object is applied to the locating means 9, the weight of the object will cause a general downward deflection of the means 9 and rocking of the frames, thereby urging the gripping means 11, 12 and 13 inwardly toward the central axis of the device.

Efficient gripping means 11, 12 and 13 are here provided in the form of horizontally diverging fingers or forked ends which may be extensions of the upright and diagonal sides, the latter being suitably intertwined, as here shown, to provide an appropriate connection, and then spread to define the forked engaging means spaced symmetrically about and from the central axis of the frame. If desired, the terminal ends of these wires may be sharpened.

A preferred form of clamping means 14 is here provided in the form of a wire ring generally encircling the upright sides 6b, 7b and 8b of the frames. These upright sides are preferably formed to diverge upwardly and away from the central axis of the stand so that on relative raising of the ring 14 the sides 6b, 7b and 8b will be drawn toward such axis so as to force the gripping means 11, 12 and 13 carried thereby against the sides of a tree trunk or the like. Preferably the ring 14 is provided with a plurality of notches 27, 28 and 29, corresponding in number to the number of upright sides and arranged symmetrically around the circumference of the ring so as to engage the upright sides when the frames are swung about their pivotal connection to a symmetrical position as illustrated in Figure 1. Also, to hold the ring in desired vertical adjusted position on the sides 6b, 7b and 8b, the latter may be undulated as here shown to afford a series of vertically spaced sockets arranged to receive and hold the ring.

To place the device in operation, the frame sides are unfolded around the pivotal connection into a symmetrical position as shown in Figure 1. The tree or other columnar object to be supported is then inserted between the forked holding means 11, 12 and 13 and forced downwardly onto the impaling pin 9. The downward deflection of the pin 9 and the inner ends of the frame under the weight of the object supported causes the frames to rock inwardly about the feet 23, 24 and 26 as fulcrums, thereby displacing the gripping means 11, 12 and 13 firmly and symmetrically against the sides of the tree. In this manner, the weight of the tree itself assists in increasing the gripping action of the stand thereby permitting the light-weight construction as illustrated to very firmly and positively position a relatively large and heavy tree or the like, since the heavier the tree the greater the gripping action. After insertion of the tree and such minor adjustment of the gripping elements as may be desired, the ring 14 is appropriately rotated to engage the vertical frame sides within the notches of the ring, and then elevated over the vertical sides to forcibly contract these sides and further displace the gripping means 11, 12 and 13 against the sides of the tree trunk or the like being supported. The device is thus very firmly and positively applied to the tree and is arranged in a pleasing and symmetrical manner about the base of the tree, as illustrated.

To remove the stand from the tree, a substantially reverse operation is effected. The ring 14 is first displaced downwardly to release the gripping means 11, 12 and 13, permitting their displacement away from the trunk of the tree, when the tree may be raised out of the stand. The stand may then be folded by swinging of the sides into a flat, compacted form as illustrated in Figure 2 for convenient storage when not in use.

I claim:
1. A tree stand comprising, a plurality of triangular frames each having base, upright and diagonal wire sides, said base sides having resilient portions projecting from said upright sides and being formed with terminal loop portions, a pivot pin inserted through and journalling said loop portions and having a sharpened end projecting vertically therefrom, the ends of said upright and diagonal sides being connected and projecting from their connection to define V-shaped tree trunk gripping means arranged symmetrically about and spaced from the vertical axis of said pin, said upright sides being formed in normally diverging relation, said resilient portions accomplishing movement of said upright sides to and from said axis by vertical displacement of said portions, and a clamping ring slidably embracing said upright sides and for displacing said upright sides and gripping means carried thereby toward said axis upon movement of said ring in the direction of divergence of said upright sides.

2. A tree stand comprising, a plurality of substantially right-triangular wire frames each having base, upright and diagonal sides, said base sides having resilient portions projecting from said upright sides and being formed with terminal loop portions, a pivot pin inserted through and journalling said loop portions and having a sharpened end projecting vertically therefrom, the connected ends of said upright and diagonal sides defining forked tree-engaging means arranged above said pin and symmetrically around the axis thereof, depending feet provided at the joinder of said base and diagonal sides functioning to support said stand in a relatively elevated position of said pin, said resilient portions of said frames permitting a downward deflection of said pin under load of a tree or the like placed thereon thereby displacing said forked means toward said axis, said upright sides normally diverging upwardly, and a clamping ring slidably embracing said vertical sides for urging said upright sides and said forked means in the direction of said axis upon movement of said clamping ring upwardly, said upright sides being undulated to provide notches for holding said ring in selected position thereon.

References Cited in the file of this patent

UNITED STATES PATENTS

| Number | Name | Date |
|---|---|---|
| 694,865 | Kachold | Mar. 4, 1902 |
| 781,552 | Riek | Jan. 31, 1905 |
| 803,308 | Riek | Oct. 31, 1905 |
| 936,619 | Foy | Oct. 12, 1909 |
| 1,151,745 | Wagner | Aug. 31, 1915 |
| 1,642,231 | Dover | Sept. 13, 1927 |
| 1,644,807 | Ziegler | Oct. 11, 1927 |
| 2,277,803 | Varner | Mar. 31, 1942 |
| 2,416,435 | Carlberg | Feb. 25, 1947 |